May 16, 1933.  J. S. MOORBY  1,909,302

ANTIGLARE DEVICE FOR REAR VIEW MIRRORS

Filed Jan. 22, 1932

Inventor
J. S. Moorby
by J. Edw. Maybee
ATTY

Patented May 16, 1933

1,909,302

UNITED STATES PATENT OFFICE

JOHN S. MOORBY, OF TORONTO, ONTARIO, CANADA

ANTIGLARE DEVICE FOR REAR VIEW MIRRORS

Application filed January 22, 1932. Serial No. 588,046.

This invention relates to anti-glare devices particularly for rear view mirrors, and is of the type in which a shield or screen of translucent glare reducing or eliminating material is interposed between the mirror and the operator of the vehicle to prevent the glare of the headlights of vehicles approaching from the rear from being reflected from the mirror to the eyes of the operator and from dazzling or temporarily blinding him. This glare has become a real menace on the highways. To avoid it motorists commonly remove or turn down their rear view mirrors, or pull down the curtain or blind on the rear window, driving "blind", a very dangerous practice.

Screens of various kinds have been devised to eliminate or reduce this glare, none of which have been satisfactory, either because of their high cost, the difficulty of installing them on cars where mirrors have already been supplied, or because they were complicated to operate and unreliable in use.

The object of this invention is to overcome the objections referred to above and to devise a screen which could be produced and sold at a low price, which could be readily applied by any vehicle owner, and which could be put into and out of operation when required by a simple motion of the hand.

My object has been achieved by supporting a swinging screen or shield on the mirror by means of a resilient metal clip which embraces the mirror and is bent at its upper end to form spring fingers which grip a flattened rod on the screen and by engagement with the flattened portion of the rod retain the screen normally in a raised position, but permit it to be swung down by a manual operation to cover the mirror and diffuse the rays of light which strike the mirror.

The invention is hereinafter more particularly described and illustrated in the accompanying drawing in which Fig. 1 is a perspective view, partly broken away, of the rear view mirror of a motor car showing my anti-glare screen in a raised position.

In the drawing, like numerals of reference indicate corresponding parts in the different figures.

Figure 1:
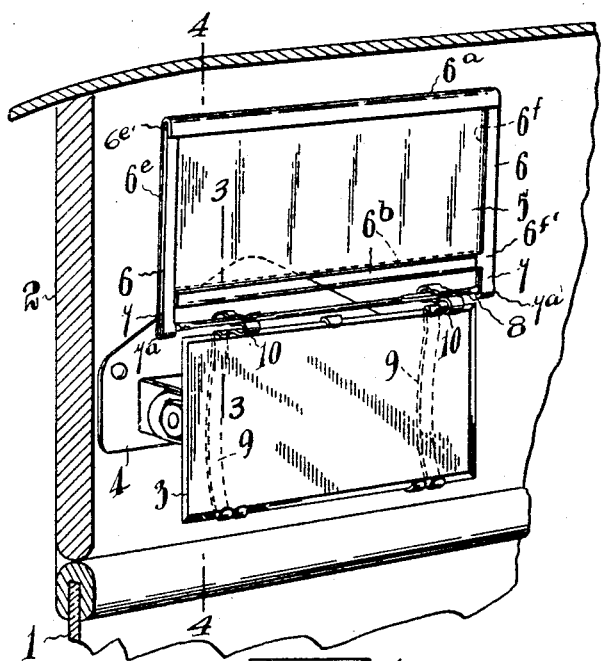
Figure 2:
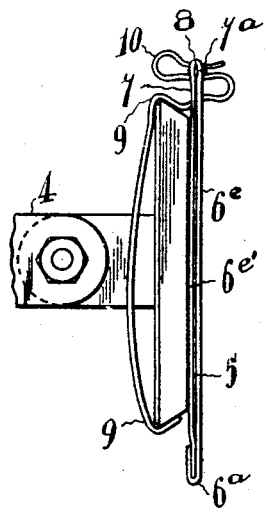
Fig. 2 is a side elevation of the mirror showing the screen in front thereof.
Figure 3:
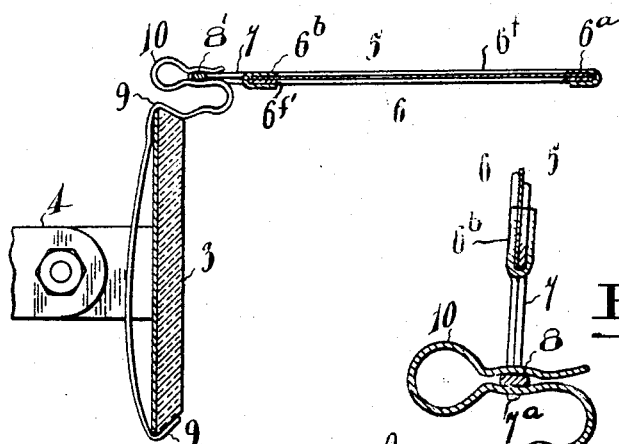
Fig. 3 is a vertical section on an enlarged scale of the spring fingers and part of the mirror in its raised position and is taken on the line 3—3 of Fig. 1.

In Fig. 1 the windshield 1 of the vehicle is shown, and the frame of the windshield, or the part of the body of the car immediately above the windshield, to which the rear view mirror is usually attached is indicated at 2. The rear view mirror 3 is supported on the frame 2 by any usual supporting bracket 4.

The anti-glare screen or shield 5 is made of colored glass, celluloid or other non-glare transparent or translucent material, and is provided with a preferably metal frame 6.

This frame is stamped from a single piece of metal and comprises two spaced cross members $6^a$ and $6^b$, which can be bent into channel form, and two spaced end pieces $6^e$ and $6^f$. These end pieces are disposed perpendicularly to the cross members and project beyond the inner cross member $6^b$ a distance greater than the space between the cross members and are bent back upon themselves, at a point intermediate of their ends, to form bearing lugs 7—7 and clamping strips $6^{e'}$ and $6^{f'}$. The inner cross member $6^b$ is bent into channel form and a translucent screen 5 is then slipped down between the end members $6^e$ and $6^f$ and their bent-back portions $6^{e'}$ and $6^{f'}$, and into the channel $6^b$ The cross member $6^a$ includes the outer portions of the end pieces 6ᵉ and 6ᶠ and can therefore be bent into channel form so as to embrace the outer longitudinal edge of the screen 5 and the free ends of the clamping strips 6ᵉ' and 6ᶠ', thus firmly securing the screen in the frame.

When the end pieces 6ᵉ and 6ᶠ are bent as described two projecting lugs 7, 7 are formed extending at right angles to the longitudinal frame member 6ᵇ.

A cross rod 8 is mounted on the lugs 7, 7. The ends of the cross rod 8 are flattened and inserted in eyelets 7ᵃ, 7ᵃ formed in the lugs 7, 7 by the bending over of the end pieces 6ᵉ and 6ᶠ, and non-rotatably held therein.

The screen is mounted on the mirror by means of clips 9 of resilient metal. These clips 9 embrace the mirror 3 and are bent at their upper ends to form spring fingers 10 which grip the cross rod 8 at either end thereof.

Figure 4:
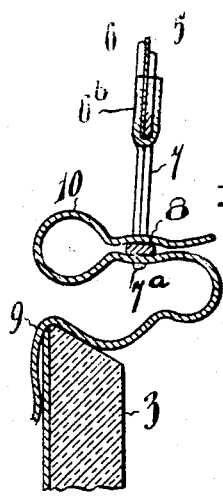
Fig. 4 is a vertical section of the mirror and screen taken on the line 4—4 of Fig. 1 and showing the screen in a position substantially at right angles to the mirror and also showing a modified construction of the cross rod.

One or more sides of the cross rod 8 are flattened at the point where the spring fingers 10 grip the said cross rod, so that when the screen is swung up the fingers engage the flattened portion and firmly hold the screen in the upright position. Preferably the screen is thus held substantially in a perpendicular position, but in cases where there is not sufficient clearance between the top of the mirror and the roof of the car, the flattened side of the cross rod 8 may be arranged so that the mirror when flipped up is held at substantially right angles to the mirror as shown at 8' in Fig. 4, or at any other convenient angle depending on the amount of clearance. Owing to the resilient nature of the spring fingers 10, the screen may by a manual operation be pulled down to cover the mirror whenever desired, or pushed up out of its operable position without loosening any screws or making any adjustments whatever.

Obviously the cross rod 8 may be made with one, two, three, four or more flat sides whereby the screen may be held in one or more desired positions or angles relative to the mirror.

The clips 9 are arched or bowed between the points of engagement with the mirror edges to permit of their adjustment to mirrors of different width.

Although two clips are shown, satisfactory results could be obtained from the use of one or more.

It will be seen from this description of my invention that I have attained the objects referred to above. The device consists of five parts only, and does not require any screws, springs, latches, hinges or other expensive and complicated parts. The device is entirely composed of sheet or drawn material and requires no casting, and can thus be very cheaply made. It can be put on in a moment and operated without difficulty and without distracting the attention of the driver while the vehicle is in motion. The device eliminates the glare when necessary, but can be flipped up out of the way to give a clear unobstructed view behind in the daytime or when there are no glaring headlights shining on the mirror.

What I claim as my invention is:

1. An anti-glare device for rear-vision mirrors, comprising a screen of translucent glare reducing material adapted to cover the mirror; a rod non-rotatably secured to the screen and extending from end to end thereof and flattened on a side thereof; and a resilient metal clip engaging the upper and lower edges of the mirror and bent at one end to form spring fingers adapted to grip the rod, whereby the screen may be swung into and out of position in front of the mirror, said spring fingers engaging the flat portion of the rod when the screen is in a raised position to normally retain it in that position.

2. An anti-glare device constructed as set forth in claim 1 in which the resilient clip is arched between its point of engagement with the mirror edges to permit of its adjustment to mirrors of different widths.

3. An anti-glare device constructed as set forth in claim 1, in which the screen is a sheet of translucent material mounted in a one-piece frame comprising two channel cross members and two transverse end members, each of said end members having a projecting portion which is bent to form a lug in which the cross bar is mounted and to form an overlying strip portion which holds the screen in registry with the cross members.

4. An anti-glare device constructed as set forth in claim 1, in which the screen is a sheet of translucent material mounted in a one-piece frame comprising inner and outer channel cross members and two transverse end members, each of said end members having a projecting portion which is bent to form a lug in which the cross bar is mounted and to form an overlying strip portion which holds the screen in registry with the cross members, the outer channel member having the same overall length as the frame and embracing and clamping the free ends of the strip portions and the outer edge of the screen.

5. An anti-glare device constructed as set forth in claim 1, in which the screen is a sheet of translucent material mounted in a one-piece frame comprising cross members and end members, each of said end members having a projecting portion which is bent to form a lug in which the cross bar is mounted and to form an overlying strip portion which holds the screen in registry with the cross members.

6. An anti-glare device constructed as set forth in claim 1, in which the screen is a sheet of translucent material mounted in a one-piece frame comprising cross-members and end members, each of said end members having a projecting portion which is bent to form a lug in which the cross bar is mounted and to form an overlying strip portion which holds the screen in registry with the cross members, one of said cross members being channel shaped and embracing and clamping a margin of the screen and the free ends of the strip portions.

Signed at Toronto, Canada, this 16th day of January, 1932.

JOHN S. MOORBY.